United States Patent [19]

Ohkubo et al.

[11] 3,802,865
[45] Apr. 9, 1974

[54] SELF SOLUBLE SLAG FORMING AGENTS FOR USE IN STEEL MAKING

[75] Inventors: Masuta Ohkubo; Moriyuki Ishiguro, both of Kawasaki, Japan

[73] Assignee: Nippon Kokan Kabushiki Kaisha, Kawasaki-shi, Kanagawa-ken, Japan

[22] Filed: Aug. 31, 1972

[21] Appl. No.: 285,475

Related U.S. Application Data

[62] Division of Ser. No. 67,621, Aug. 27, 1970, abandoned.

[30] Foreign Application Priority Data
Aug. 29, 1969  Japan.............................. 44-67947

[52] U.S. Cl.............................. 75/30, 75/53, 75/94
[51] Int. Cl. ......................... C21b 3/04, C21b 5/04
[58] Field of Search .............. 75/10, 11, 12, 53, 93, 75/94, 30

[56] References Cited
UNITED STATES PATENTS

| 3,585,025 | 6/1971 | Obst....................................... 75/53 |
| 3,537,842 | 11/1970 | Holland ................................. 75/53 |
| 3,288,572 | 11/1966 | Tadsen................................... 75/30 |
| 3,426,833 | 2/1969 | Randak................................... 75/53 |
| 2,781,256 | 2/1957 | Richards................................. 75/53 |
| 2,750,280 | 6/1956 | Perrin .................................... 75/55 |
| 3,301,663 | 1/1967 | Wicher ................................... 75/58 |
| 2,779,675 | 1/1957 | Vennerholm ........................... 75/55 |
| 3,519,386 | 11/1965 | Fedock ................................... 75/94 |
| 3,547,622 | 12/1970 | Hutchinson............................. 75/49 |

*Primary Examiner*—L. Dewayne Rutledge
*Assistant Examiner*—Peter D. Rosenberg
*Attorney, Agent, or Firm*—Flynn & Frishauf

[57] ABSTRACT

An improvement in the manufacture of steel in which a slag-forming agent is added to the steel-forming components of a steel refining furnace. The improvement consists of utilizing a slag-forming agent consisting essentially of pellets having a composition in percent by weight of 50-80 of CaO, 15-30 of $SiO_2$, 3-7 of $Al_2O_3$, and 2-15 of $Fe_2O_3$.

4 Claims, No Drawings

SELF SOLUBLE SLAG FORMING AGENTS FOR USE IN STEEL MAKING

This application is a divisional application of copending application S.N. 67,621, filed Aug. 27, 1970, which is now abandoned.

The present invention relates to a slag forming agent suitable for use in steel making furnaces such as converters, open-hearth furnaces and electric furnaces, which agent is a self-soluble type of precalcined CaO - $SiO_2$ - $Al_2O_3$ - $Fe_2O_3$ and has excellent slag forming properties.

Slag forming agents which have heretofore been used in steel making include, for example: (1) those obtained from naturally occurring ores such as limestone, fluospar, iron sand, etc. by pulverizing, sieving and/or compounding to produce a desired particle size and composition, (2) those, as in the case of lime, obtained by grinding ores, calcining the ground ores without adding other materials, and screened to size the grains; and (3) iron oxides such as dusts, scale, etc., produced as by-products in plants. Thus, naturally existing materials as such or those merely calcined to remove $CO_2$ have commonly been used as a slag forming agent, and in exceptional cases several materials are compounded to give an appropriate composition, calcined to produce a material chemically distinct from the individual starting materials, and then used as a slag forming agent. Calcium ferrite (CaO - $Fe_2O_3$) has only been used tentatively.

As is well known, the purpose of slag forming in a basic steel making process is to form a molten slag wherein a $CaO/SiO_2$ ratio is within of range of from about 2.5 to about 4, thereby causing impurities in the molten iron, such as P and S, to migrate into the slag, thus removing them from the metal.

For this, lime which has been charged in a solid state should become molten, and, for this purpose, an additional material such as fluospar or scale has heretofore been used together with lime. In a high temperature furnace, $SiO_2$ formed by the oxidation of Si in the molten iron, $CaF_2$ or iron oxide from the fluospar or the scale, respectively, and the lime, are re-acted together to form a low melting point slag.

Such a method for slag formation according to the prior art wherein a high temperature furnace is used to react separate particles of lime, scale and fluospar of a certain size, to form a low melting slag, requires considerable time and heat, i.e., in dissolving the lime, and in consequence the retarded slag formation frequently results in unsatisfactory dephosphization and desulfurization. This has been one of the defects of the prior art, reducing the efficiency and productivity of steel making processes.

To overcome the disadvantages caused by the use of separate particles of the individual components, the present invention provides a slag forming agent in which particles have approximately the same size and composition. When expressed in terms of oxide composition, particles of a slag forming agent in accordance with the present invention comprise 50 to 80 percent by weight of CaO, 15 to 30 percent by weight of $SiO_2$, 3 to 7 percent by weight of $Al_2O_3$ and 2 to 15 percent by weight of $Fe_2O_3$. The slag forming agent of the present invention can readily be prepared by compounding and calcining appropriate materials to produce a composition comprising, when expressed in terms of oxide composition, 50 to 80 percent by weight of CaO, 15 to 30 percent by weight of $SiO_2$, 3 to 7 percent by weight of $Al_2O_3$ and 2 to 15 percent by weight of $Fe_2O_3$, and subsequently screening to size the grains. Since each grain of the slag forming agent has an optimum composition as a slag forming agent, it is self soluble, i.e., when used in the slag formation it dissolves rapidly.

The invention will be illustrated by the example.

Example

In this example, a slag forming test was carried out in a 500 kg electric furnace using the self-soluble slag forming agent of the present invention.

A clinker, which is a self-soluble slag forming agent of the present invention having a composition as shown in Table I, was prepared by compounding materials, calcining and screening.

TABLE I

| Composition of the clinker (% by weight) | | | | | |
| --- | --- | --- | --- | --- | --- |
| $SiO_2$ | $Al_2O_3$ | $Fe_2O_3$ | CaO | MgO | $SO_3$ |
| 23.0 | 5.7 | 3.1 | 65.5 | 1.5 | 0.5 |

Using this clinker a steel making process was carried out in the small electric furnace described above. About 300 kg of molten material, and a temperature between 1,550° and 1,650°C. was used. During the process, the state of the slag, behavior of P and S in the molten iron, and time for slag formation were observed. The results are shown in Table II.

TABLE II

| Operation | Time (min.) | C (%) | P (%) | S (%) | State of Slag |
| --- | --- | --- | --- | --- | --- |
| Melting and Removal of Slag | 0 | 0.68 | 0.105 | 0.014 | None |
| Addition of 20 kg of clinker and 3 kg of Scale | 1 | – | – | – | – |
| Sampling of Molten Iron | 10 | 0.57 | 0.028 | 0.018 | Molten |
| State of Bessemerizing | 11 | – | – | – | Molten |
| End of Bessemerizing | 14 | – | – | – | Molten |
| Sampling | 15 | 0.24 | 0.010 | 0.019 | Molten |

The combination of the clinker and the scale is more soluble than lime and became molten within 9 minutes even without bessemerizing. The slag formed had a composition wherein the $CaO/SiO_2$ ratio was 3.2 and dephosphorization proceeded rapidly. 3 minutes of bessemerizing enhanced the contact of slag with metal and caused a further dephosphorization. Concerning sulfur, the content of sulfur in the molten iron increased adversely, presumably because of a high S in the slag forming agent and the oxidizing atmosphere.

As seen from the above example, the self-soluble slag forming agent of the present invention has many advantages. For example, it has superior solubility over a prior art slag forming agent such as lime alone, and has better slag forming properties. The amount of expensive materials such as fluospar, to be used together with a main slag forming agent may be reduced advantageously. For example, if half of the lime to be used is replaced by the cement-like clinker, the amount of fluospar to be used may be reduced to half or less. The invention also contemplates saving expensive lime and converting cheap limestone of low quality and clay into an excellent self-soluble slag forming agent, thus contributing to a cost reduction and improvement of efficiency and productivity in steel making processes.

We claim:
1. In the manufacture of steel in a furnace wherein a slag-forming agent is employed with steel-forming components, the improvement which comprises charging to the furnace a slag-forming agent consisting essentially of uniformly sized particles, each of said particles having a composition, in percent by weight, of 50 to 80 of CaO, 15 to 30 of $SiO_2$, 3 to 7 of $Al_2O_3$ and 2 to 15 of $Fe_2O_3$.

2. The manufacture defined by claim 1, wherein the agent has a $CaO/SiO_2$ ratio of about 3.2.

3. The manufacture defined by claim 1, wherein the agent has the following approximate composition: 65.5 CaO, 23.0 $SiO_2$, 5.7 $Al_2O_3$, 3.1 $Fe_2O_3$ and 1.5 MgO.

4. The manufacture defined by claim 1, wherein the furnace is an electric furnace.

* * * * *